United States Patent
Ben-Dayan Rubin et al.

(10) Patent No.: US 10,148,872 B2
(45) Date of Patent: Dec. 4, 2018

(54) IMAGE DIFFERENCE BASED SEGMENTATION USING RECURSIVE NEURAL NETWORKS

(71) Applicant: INTEL CORPORATION, Santa Clara, CA (US)

(72) Inventors: Daniel David Ben-Dayan Rubin, Tel Aviv (IL); Elad Hoffer, Haifa (IL)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 15/426,304

(22) Filed: Feb. 7, 2017

(65) Prior Publication Data

US 2018/0227483 A1    Aug. 9, 2018

(51) Int. Cl.
*H04N 5/232* (2006.01)
*G06T 7/11* (2017.01)
(Continued)

(52) U.S. Cl.
CPC .......... *H04N 5/23229* (2013.01); *G06K 9/38* (2013.01); *G06K 9/42* (2013.01); *G06T 7/11* (2017.01); *G06T 7/149* (2017.01); *G06T 2207/10016* (2013.01); *G06T 2207/10024* (2013.01); *G06T 2207/20081* (2013.01); *G06T 2207/20084* (2013.01); *G06T 2207/20224* (2013.01)

(58) Field of Classification Search
CPC ....... H04N 5/23229; G06T 7/11; G06T 7/149; G06T 2207/20081; G06T 2207/10024; G06T 2207/20224; G06T 2207/10016; G06T 2207/20084; G06K 9/38; G06K 9/42

See application file for complete search history.

(56) References Cited

U.S. PATENT DOCUMENTS 7,668,397 B2 * 2/2010 Le Dinh .............. H04N 17/004
                                                          382/232
9,558,268 B2 * 1/2017 Tuzel ................. G06F 17/30707
(Continued)

OTHER PUBLICATIONS

Pinheiro, Pedro and Ronan Collobert, "Recurrent Convolutional Neural Networks for Scene Labeling", Proceedings of the 31st International Conference on Machine Learning, 2014, 9 pages.

*Primary Examiner* — Padma Haliyur
(74) *Attorney, Agent, or Firm* — Finch & Maloney PLLC

(57) ABSTRACT

Techniques are provided for image segmentation based on image differencing, using recursive neural networks. A methodology implementing the techniques according to an embodiment includes quantizing pixels of a first image frame, performing a rigid translation of the quantized first image frame to generate a second image frame, and performing a differencing operation between the quantized first image frame and the second image frame to generate a sparse image frame. A neural network can then be applied to the sparse image frame to generate a segmented image. In still another embodiment, the methodology is applied to a sequence or set of image frames, for example from a video or still camera, and pixels from a first and second image frame of the sequence/set are quantized. The sparse image frame is generated from a difference between quantized image frames. The method further includes training the neural network on sparse training image frames.

24 Claims, 10 Drawing Sheets

(51) Int. Cl.
*G06T 7/149* (2017.01)
*G06K 9/38* (2006.01)
*G06K 9/42* (2006.01)

(56) References Cited

U.S. PATENT DOCUMENTS

2005/0190966 A1* 9/2005 Etienne-Cummings ..................... H04N 9/045 382/165
2017/0372505 A1* 12/2017 Bhat ........................ G06T 13/40

* cited by examiner

IMAGE DIFFERENCE BASED SEGMENTATION USING RECURSIVE NEURAL NETWORKS

BACKGROUND

Many image processing and robotics applications involve image segmentation. Image segmentation typically creates a label for each pixel of an image frame to define that pixel's membership class. For example, in an Advanced Driver Assistance System (ADAS), pixels might be classified and labeled as one of "road," "car," "pedestrian," or "sign." Image segmentation is also applicable to tasks such as obstacle avoidance, path/trajectory planning, robotic vision, and object identification class correction. The segmentation problem is relatively complex and computationally intensive because the characteristics of an entire image frame generally need to be learned, for example using a neural network, based on statistics calculated from all or most of the pixels in that image. The segmentation problem becomes even more difficult in video applications where many such image frames need to be processed.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts.

Figure 1:
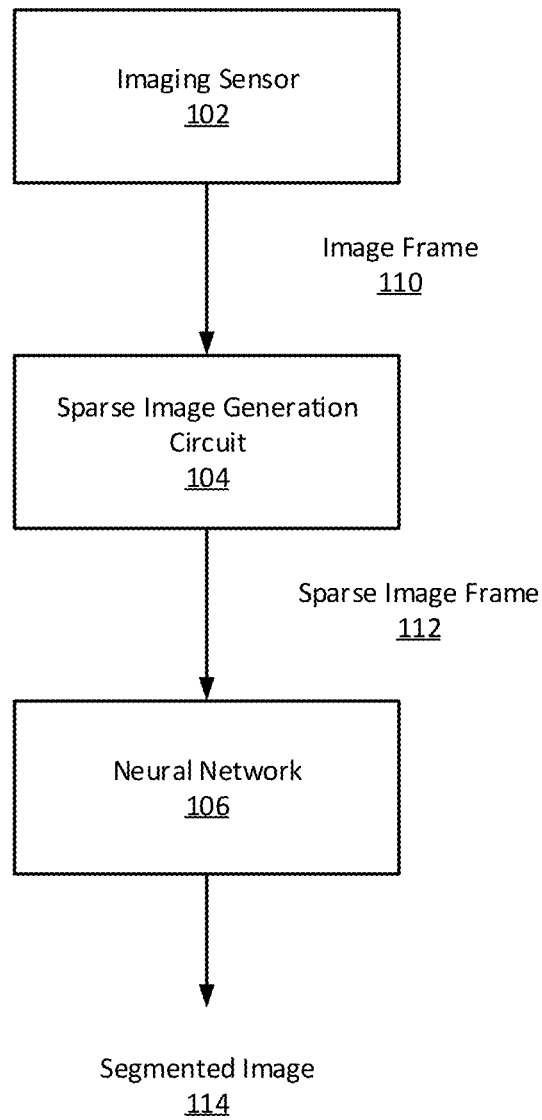
FIG. 1 is a top-level block diagram of an image segmentation system, configured in accordance with certain embodiments of the present disclosure.

Although the following Detailed Description will proceed with reference being made to illustrative embodiments, many alternatives, modifications, and variations thereof will be apparent in light of this disclosure.

DETAILED DESCRIPTION

Generally, this disclosure provides techniques for image segmentation based on image differencing, using recursive neural networks. The segmentation techniques disclosed herein transform one or more received image frames into sparse image frames, where many of the pixel values are zero, by quantizing the pixels of two similar frames and calculating the difference between those frames. A neural network, which has been trained on similarly prepared sparse image training data, may then perform segmentation on these differenced frames. In some embodiments, the two similar frames may be consecutive frames selected from a sequence of video images. Or, in a similar embodiment, a video receiver, such as an artificial retina, may provide only perceived movements in terms of quantized image differences. In other embodiments, a single image frame may be translated by a small offset to provide the second "similar" frame for the differencing operation. In either case, the sparse image that results from the differencing operation allows the neural network to perform segmentation with increased accuracy and efficiency compared to existing techniques, as will be explained in greater detail below.

The disclosed techniques can be implemented, for example, in a computing system or a software product executable or otherwise controllable by such systems, although other embodiments will be apparent. The system or product is configured to provide improved image segmentation. In accordance with an embodiment, a methodology to implement these techniques includes quantizing pixels of a first image frame. The first image frame may be provided, for example, by an imaging sensor or a database of images. The method also includes performing a rigid translation of the quantized first image frame to generate a second image frame and performing a differencing operation between the quantized first image frame and the second image frame to generate a sparse image frame or gradient that tends to represent the contours of the image. The method further includes applying a neural network to the sparse image frame to generate a segmented image. In still other embodiments, the methodology is applied to a sequence of image frames, provided, for example by a video camera, although a digital still camera can provide such a sequence of related image frames as well, as will be appreciated. In such an embodiment, pixels from a first and second image frame of the sequence are quantized and the sparse image frame is generated from a difference between the quantized image frames. The method further includes training the neural network on quantized sparse image frames that have been generated in a similar manner.

As will be appreciated, the techniques described herein may allow for improved image segmentation based on sparse images, compared to existing methods that require the complex statistics of the segmented parts to be calculated on all or most of the pixels of an image. Additionally, these techniques allow for significantly reduced power requirements in the imaging or video devices, due to the lower bandwidth of the differenced images. The disclosed techniques can be implemented on a broad range of platforms and may be integrated with the imaging sensor or video camera, as a result of the reduced processing and power requirements associated with this methodology. These techniques may further be implemented in hardware or software or a combination thereof.

FIG. 1 is a top-level block diagram 100 of an image segmentation system, configured in accordance with certain embodiments of the present disclosure. The system is shown to include an imaging sensor 102, a sparse image generation circuit 104, and a neural network 106. In some embodiments, the imaging sensor 102 may be a camera or other suitable device, configured to provide an image frame 110 comprising an array of pixels, for example in an x, y plane. In some embodiments, the image may be a color image comprising multiple channels, such as, for example red, green, and blue pixels, for each location in the x, y plane. The sparse image generation circuit 104 is configured to generate a sparse image frame 112 based on the image frame 110 using quantization and differencing techniques, as will be described in greater detail below. The neural network 106 is configured to analyze the sparse image frame 112 to generate a segmented image 114, for example where each pixel is labeled as belonging to a selected classification. In more detail, and according to some example embodiments, the neural network based image segmentation process assigns labels to each pixel of an image frame to define that pixel's membership class. For instance, the pixels of an image may be classified as "sky," "tree," "road," "grass," "water," "building," "mountain," "human," "animal," "foreground," or "background." Such labeling forms a basis for further processing in many applications including robotics, computer assisted driving, computer vision, obstacle avoidance, object identification, surveillance, and path planning. In some embodiments, the neural network 106 is a recursive convolutional neural network (CNN) and is trained on sparse image frames generated from training image frame data. In some embodiments, the recursive convolutional neural network includes two CNN layers. In some further embodiments, the sparse image generation circuit 104 and/or the neural network 106 may be integrated into the imaging sensor 102.

Figure 2:
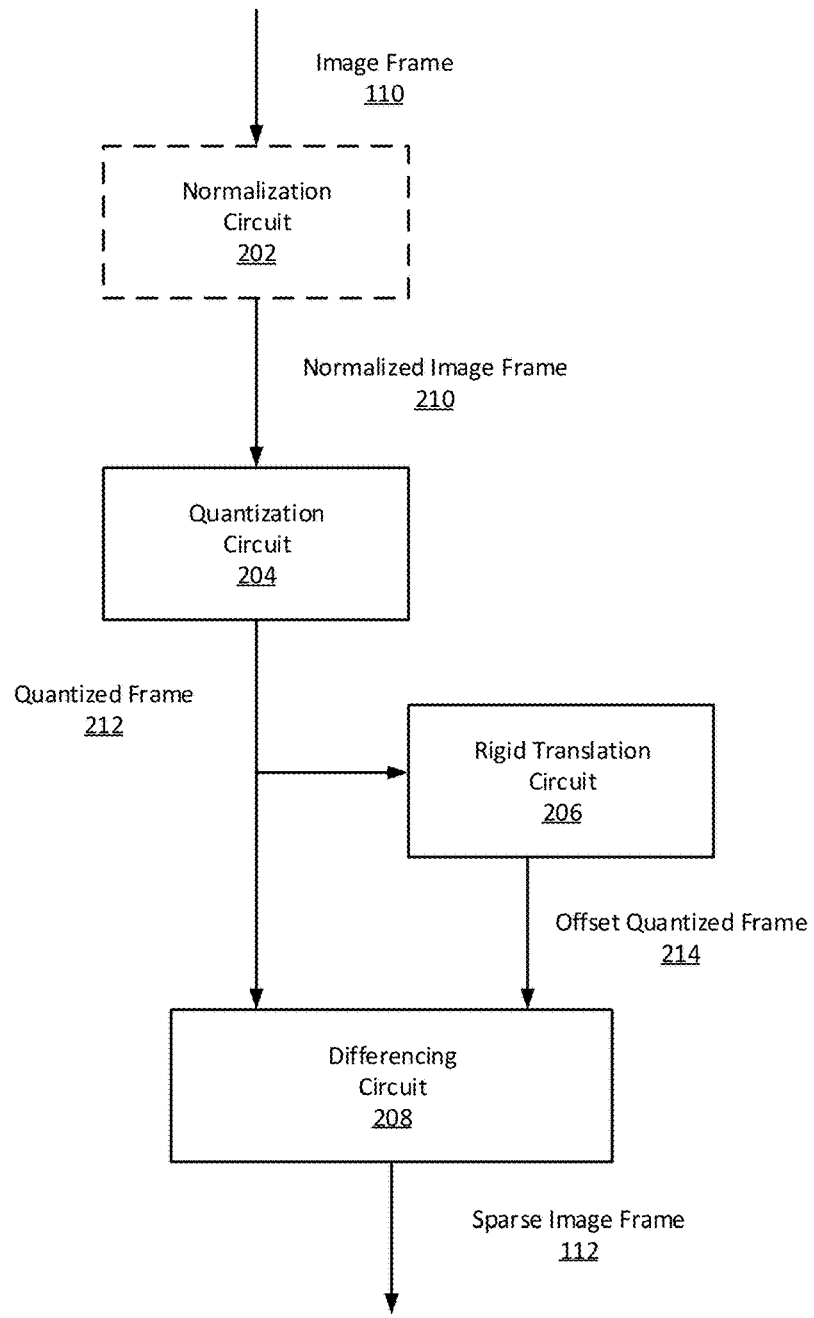
FIG. 2 is a block diagram of a sparse image generation circuit for image segmentation, configured in accordance with certain embodiments of the present disclosure.

FIG. 2 is a block diagram of a sparse image generation circuit 104 for image segmentation, configured in accordance with certain embodiments of the present disclosure. The sparse image generation circuit 104 is shown to include a quantization circuit 204, a rigid translation circuit 206, and a differencing circuit 208. In some embodiments, the sparse image generation circuit 104 may also include a normalization circuit 202.

The quantization circuit 204 is configured to quantize pixels of the received image frame to a selected number of bits. Quantization may be achieved by truncating or rounding the pixel values so that only a reduced number of most significant bits are considered. In some embodiments, the level of quantization, may range from seven bits to four bits, where four bits represents the greatest degree of quantization. One of the effects of quantization is to reduce spatial variations in the background of the image.

The rigid translation circuit 206 is configured to perform a rigid translation on the quantized image frame 212 to generate a shifted image frame 214 that is offset from the quantized image frame 212 by a set number of pixels in the x axis and/or the y axis direction. The translation is considered rigid because all pixels are shifted by the same offset. In some embodiments, the offset is one pixel in a random x, y direction (e.g., up, down, left, or right). In some embodiments, the offset is one pixel in both the x and y directions.

The differencing circuit 208 is configured to perform a differencing operation between the quantized image frame 212 and the translated quantized image frame 214 to generate a gradient image that is sparse 112 (e.g., an image with relatively few nonzero pixels). The differencing operation is an arithmetic subtraction between each pixel of the first image frame 212 and the associated pixel of the second image frame 214 (e.g., the pixel at the same x, y location). Quantization tends to increase the probability that the differenced pixels will have a value of zero, as will be explained in greater detail below, resulting in a relatively sparse gradient image. The sparse gradient image frame 112, which tends to represent the contours in the original image, is provided to the neural network 106. In some embodiments, other techniques may be used to generate such contour images, in light of the present disclosure.

In the case of color images, the quantization, translation, and differencing operations may be performed independently on each red, green, and blue channel of pixels in the image frame.

The use of sparse gradient images provides a reduction in the bandwidth of data supplied to the neural network, since many of the pixels are zero valued. In some embodiments, the bandwidth reduction can exceed 70 percent. The use of sparse gradient images can also improve the neural network training time and inference time, with little or no performance degradation. This is possible because the neural network, which is also trained on sparse images, can assign each pixel to a membership class based on contour lines that serve as borders between segmentation regions, rather than calculating complex statistics on all or most of the pixels in the original (non-sparse) image.

As explained previously, in some embodiments, the neural network 106 is a recursive convolutional neural network (CNN) and is trained on sparse image frames generated from training image frame data. The recursive convolutional neural network may comprise two CNN layers configured to perform two feedforward iterations. This typology configuration has been found to perform well on image differences (e.g., the sparse image generated as described above) due to the ability to inherit single pixel information from neighboring pixels. In some embodiments, other known neural network configurations may be used, in light of the present disclosure.

The normalization circuit 202 is configured to normalized the values of the pixels of the received image frame relative to other image frames that are to be segmented. The resulting normalized image frame 210 may allow for improved segmentation accuracy in some cases. In some embodiments, the normalization may be a Gaussian Normal distribution, N(0,1), of zero mean and unit variance.

Figure 3:
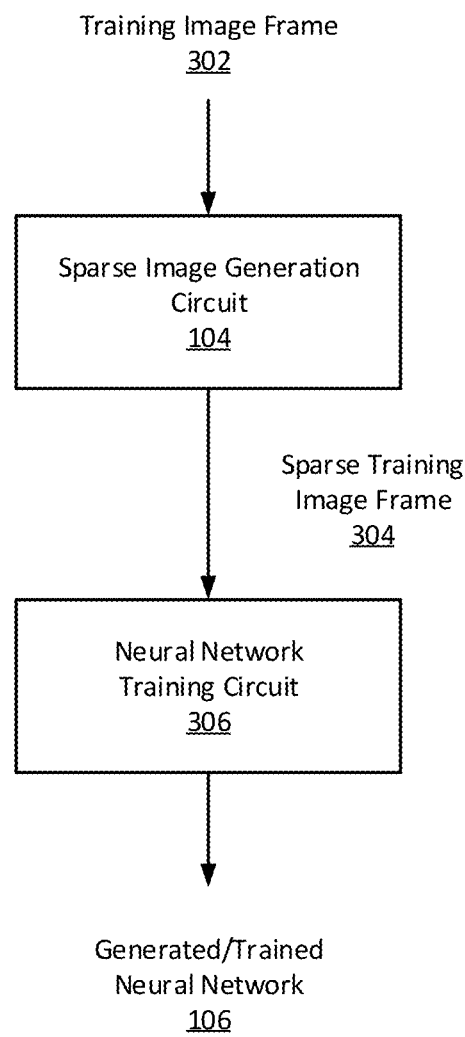
FIG. 3 is a block diagram of a neural network training system for image segmentation, configured in accordance with certain embodiments of the present disclosure.

FIG. 3 is a block diagram 300 of a neural network training system for image segmentation, configured in accordance with certain embodiments of the present disclosure. A number of training image frames 302 are provided to the sparse image generation circuit 104 to generate sparse training image frames 304. Neural network training circuit 306 is configured to train, or otherwise generate, the neural network 106 based on the sparse training image frames.

Figure 4:
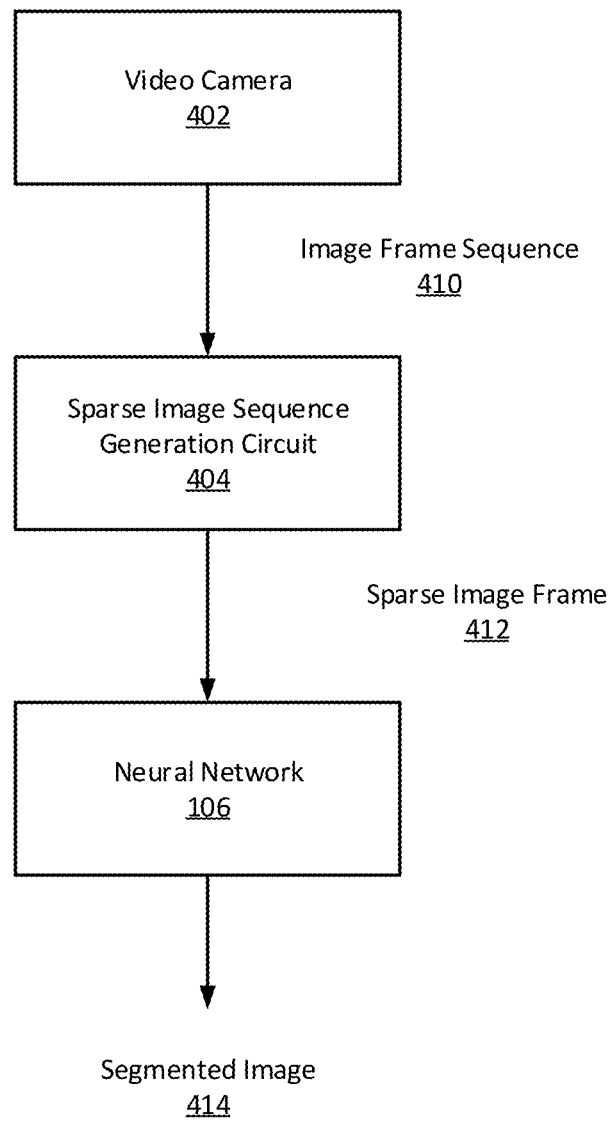
FIG. 4 is a top-level block diagram of another image segmentation system, configured in accordance with certain embodiments of the present disclosure.

FIG. 4 is a top-level block diagram 400 of another image segmentation system, configured in accordance with certain embodiments of the present disclosure. In this embodiment, a sequence of image frames 410 (e.g., a video stream) is provided, for example by a video camera 402 or other suitable device. The system is shown to include a sparse image sequence generation circuit 404, configured to generate sparse images based on differences between the sequence of images, as will be explained in greater detail below. The system is shown to further include the neural network 106 configured to generate a segmented image 414 based on the sparse image frames 412, as previously described. In some embodiments, the sparse image sequence generation circuit 404 and/or the neural network 106 may be integrated into the video camera 402.

Figure 5:
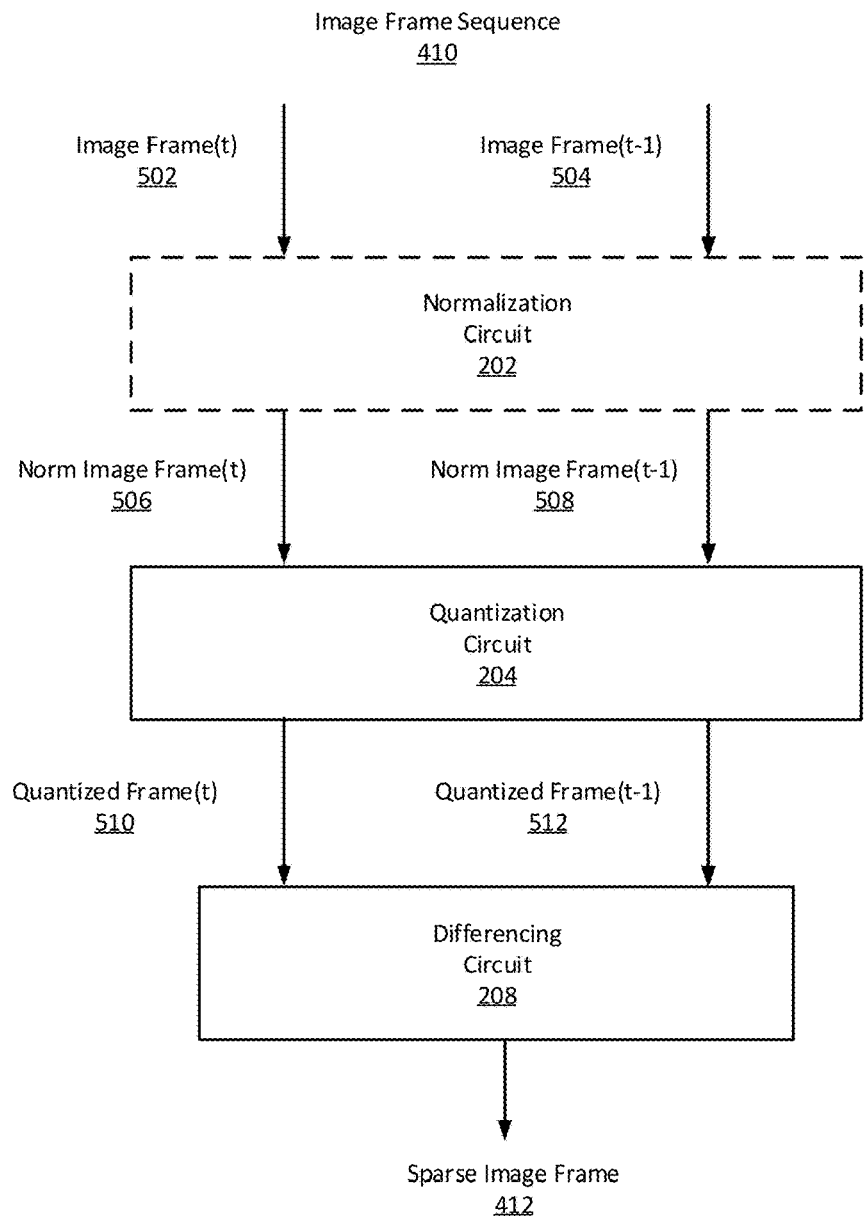
FIG. 5 is a block diagram of sparse image sequence generation circuit for image segmentation, configured in accordance with certain embodiments of the present disclosure.

FIG. 5 is a block diagram of sparse image sequence generation circuit 404 for image segmentation, configured in accordance with certain embodiments of the present disclosure. The sparse image sequence generation circuit 404 is shown to include the quantization circuit 204, the differencing circuit 208, and the optional normalization circuit 202. The sparse image sequence generation circuit 404 operates in a manner similar to that of the sparse image generation circuit 104, described previously. One difference between the two circuits, however, is that circuit 404 operates on a pair of image frames 502, 504 selected from the sequence of image frames 410 of the provided video stream. Thus, the rigid translation performed by circuit 104 to generate a second image for differencing, is not required, in this embodiment.

Two image frames 502, 504, are selected from image frame sequence 410 for segmentation. In some embodiments, the image frames may be consecutive image frames, for example at time t and time t-1. The quantization circuit 204 is configured to quantize pixels of the image frames 502, 504 (or, in some embodiments, the normalized image frames 506, 508) to a selected number of bits. Quantization may be achieved, as previously described, by truncating or rounding the pixel values so that some number of least significant bits of the pixel value are set to zero, leaving the selected number of most significant bits to represent the pixel.

The differencing circuit 208 is configured to perform a differencing operation between the quantized image frames 510, 512 to generate a sparse gradient image 412 associated with those frames from the frame sequence. The differencing operation is an arithmetic subtraction between each pixel of the first image frame 510 and the associated pixel of the second image frame 512 (e.g., the pixel at the same x, y location). The gradient image, which tends to represent the contours in the original images 502, 504, is provided to the neural network 106. In some embodiments, other techniques may be used to generate such contour images, in light of the present disclosure.

In some embodiments, the segmentation process, as described above, may be repeated on subsequent pairs of image frames from the video stream so that segmentation processing is applied to the entire stream.

Figure 6:
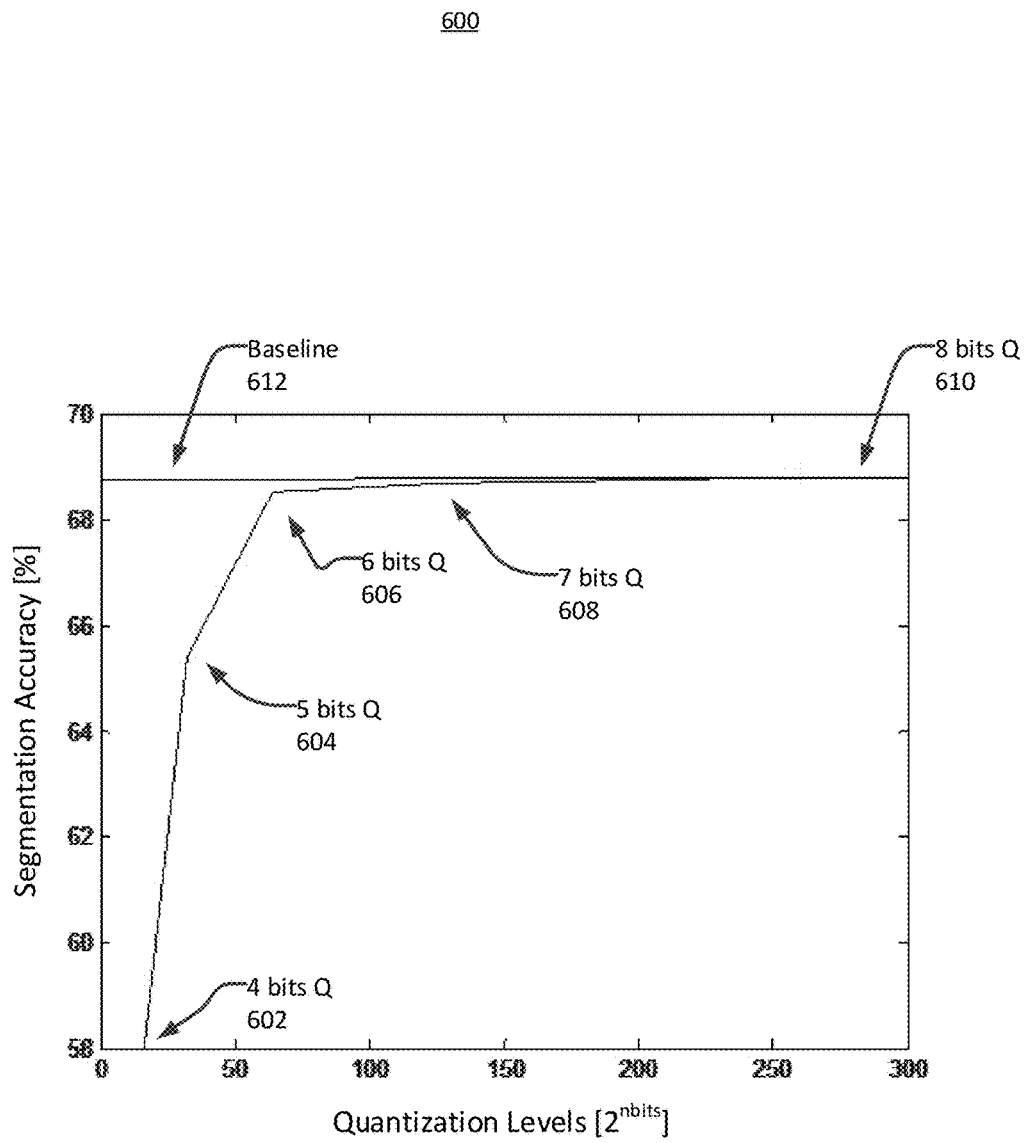
FIG. 6 is a plot of segmentation accuracy as a function of quantization, in accordance with certain embodiments of the present disclosure.

FIG. 6 is a plot 600 of segmentation accuracy as a function of quantization, in accordance with certain embodiments of the present disclosure. The plot of experimental results shows that at four bits of quantization 602 (i.e., allowing 16 possible values for a pixel), the segmentation accuracy is approximately 58 percent. At five bits of quantization 604 (i.e., allowing 32 possible values for a pixel), the segmentation accuracy increases to approximately 65 percent. At six bits of quantization 606 (i.e., allowing 64 possible values for a pixel), the segmentation accuracy increases further to approximately 69 percent. As can be seen, the segmentation accuracy improvement levels off beyond six bits of quantization. At seven bits 608 and at eight bits 610, the accuracy approached the baseline level 612.

Figure 7:
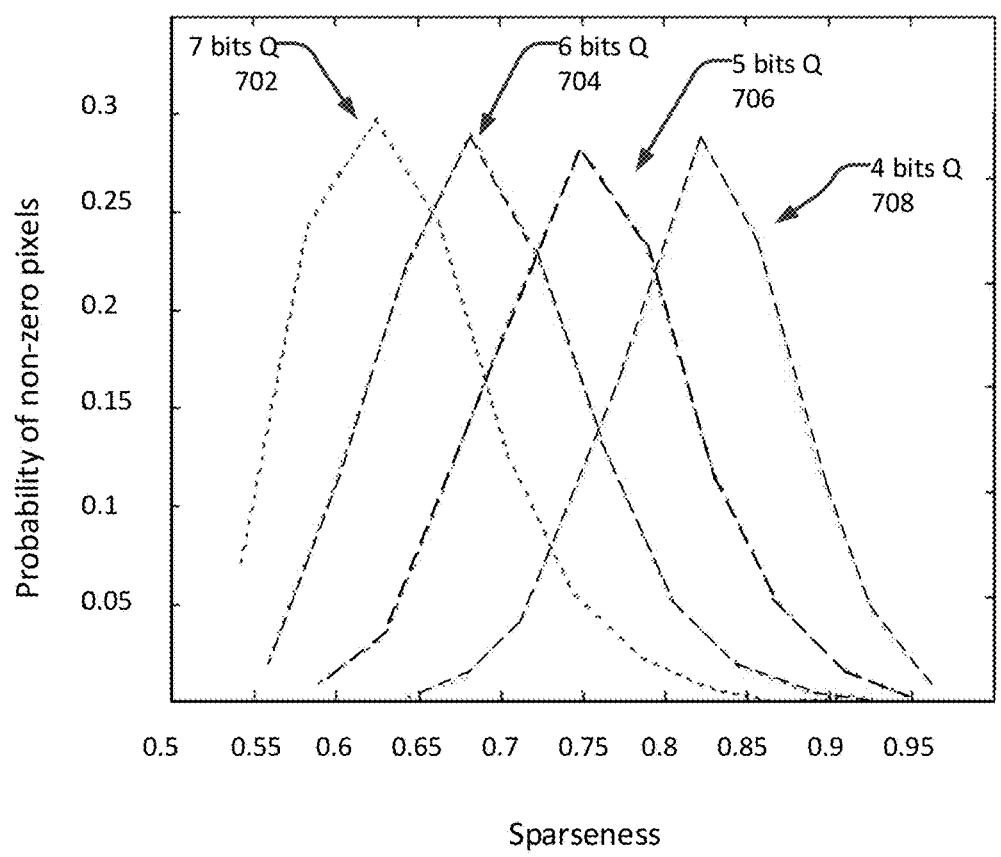
FIG. 7 is a plot of probability of nonzero pixels for different levels of quantization, in accordance with certain embodiments of the present disclosure.

FIG. 7 is a plot 700 of probability of nonzero pixels for different levels of quantization, in accordance with certain embodiments of the present disclosure. Four plots are shown, providing experimental results for varying levels of quantization: four bits of quantization 708, five bits of quantization 706, six bits of quantization 704, and seven bits of quantization 702. Each plot illustrates the probability of nonzero pixels in the generated sparse image frame 112, 412 as a function of the sparseness of that frame. Sparseness is defined, for this purpose, as one minus the nonzero ratio (NZR) for the frame, and the NZR is defined as a count of the nonzero pixels divided by the total number of pixels of the frame.

Figure 8:
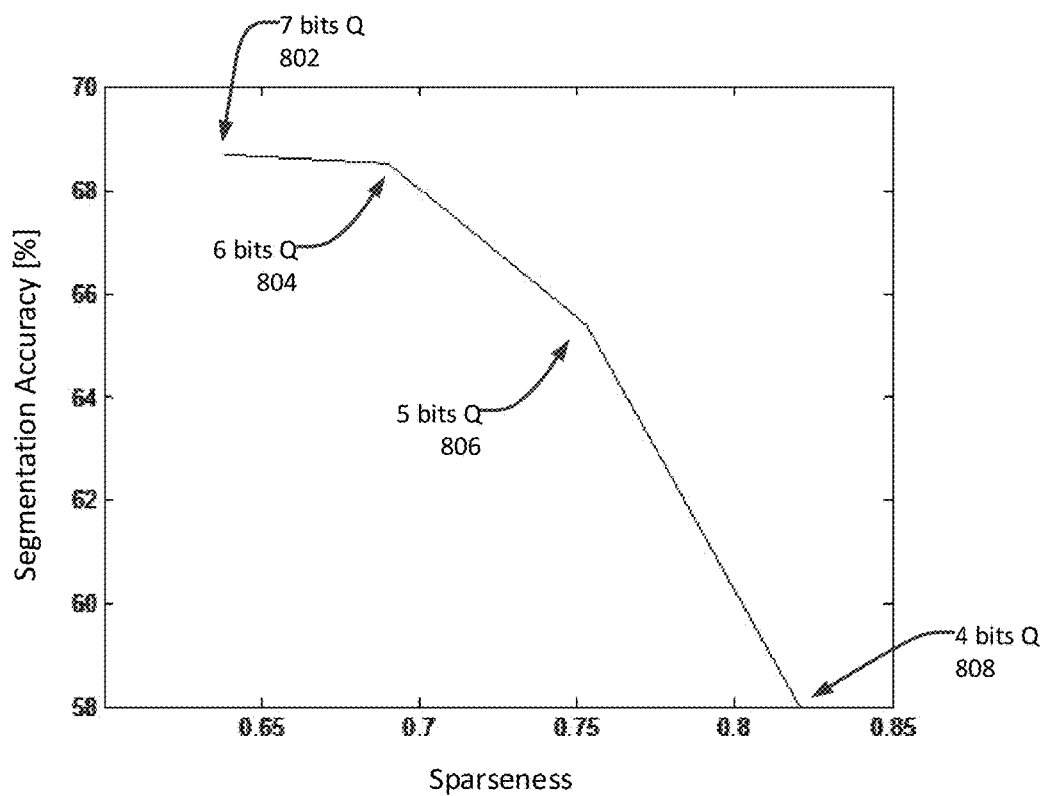
FIG. 8 is a plot of segmentation accuracy as a function of sparseness, in accordance with certain embodiments of the present disclosure.

FIG. 8 is a plot 800 of segmentation accuracy as a function of sparseness, in accordance with certain embodiments of the present disclosure. This plot provides an alternative representation of the experimental results shown in FIG. 6, wherein segmentation accuracy is plotted against average sparseness as defined above. As can be seen, the average sparseness increases with increasing levels of quantization, from seven bits 802, to six bits 804, to five bits 806, to four bits 808, with a corresponding loss in segmentation accuracy. Thus, a trade-off can be made between accuracy and reduced computation associated with higher levels of quantization and increased average sparseness. On the other hand, it is seen that segmentation accuracy does not significantly improve for decreasing levels of quantization greater than six or seven bits.

Methodology

Figure 9:
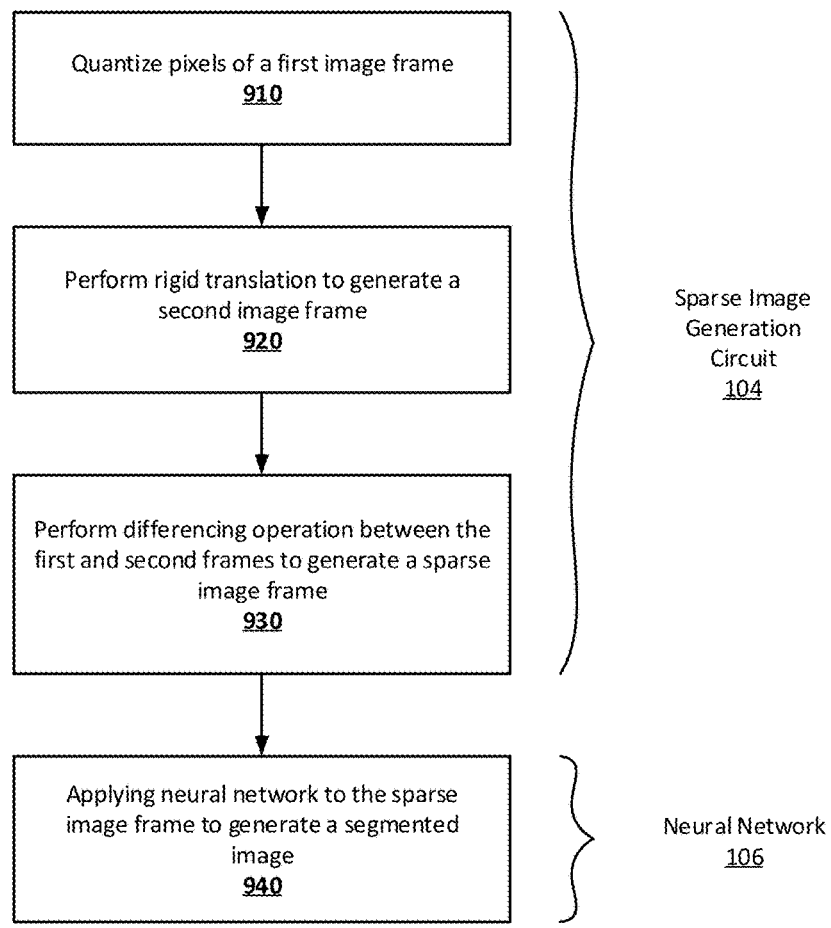
FIG. 9 is a flowchart illustrating a methodology for image difference based segmentation, in accordance with certain embodiments of the present disclosure.

FIG. 9 is a flowchart illustrating an example method 900 for image difference based segmentation, in accordance with certain embodiments of the present disclosure. As can be seen, example method 900 includes a number of phases and sub-processes, the sequence of which may vary from one embodiment to another. However, when considered in the aggregate, these phases and sub-processes form a process for image segmentation in accordance with certain of the embodiments disclosed herein. These embodiments can be implemented, for example using the system architecture illustrated in FIGS. 1-5 as described above. However other system architectures can be used in other embodiments, as will be apparent in light of this disclosure. To this end, the correlation of the various functions shown in FIG. 9 to the specific components illustrated in the other figures is not intended to imply any structural and/or use limitations. Rather, other embodiments may include, for example, varying degrees of integration wherein multiple functionalities are effectively performed by one system. For example, in an alternative embodiment a single module can be used to perform all of the functions of method 900. Thus, other embodiments may have fewer or more modules and/or sub-modules depending on the granularity of implementation. In still other embodiments, the methodology depicted can be implemented as a computer program product including one or more non-transitory machine readable mediums that when executed by one or more processors cause the methodology to be carried out. Numerous variations and alternative configurations will be apparent in light of this disclosure.

As illustrated in FIG. 9, in one embodiment, method 900 for image segmentation commences by quantizing pixels of a first image frame to a selected number of bits, at operation 910. In some embodiments, the selected number of bits may be in the range of seven to four bits (e.g., four bits representing a greater degree of quantization). In some embodiments, the image frame may be provided by an imaging sensor.

Next, at operation 920, a rigid translation is performed on the quantized first image frame to generate a second image frame. The second image frame is offset from the first image frame, for example, by plus or minus 1 pixels in the x and y axis directions (e.g., the x, y axes defining the plane of the image). Of course, in some embodiments, other offset values may be chosen.

At operation 930, a differencing operation is performed between the quantized first image frame and the second image frame to generate a gradient image that is relatively sparse, which is to say that most pixels of the gradient image are zero valued. In general, the sparseness of the gradient image will increase as the quantization increases, for example from seven bits to four bits. At operation 940, a neural network is applied to the sparse image frame to generate a segmented image. In some embodiments, the neural network is a recursive convolutional neural network.

Of course, in some embodiments, additional operations may be performed, as previously described in connection with the system. For example, the pixels of the first image frame may be normalized relative to other image frames that are to be segmented. The normalization may be to a normal distribution, N(0,1), of zero mean and unit variance.

Additionally, in some embodiments, the neural network is trained on a collection of sparse images that are generated in the manner described above.

In an alternative embodiment, a sequence of image frames may be received, for example, from a video camera. In such cases, each received image frame may be quantized and sparse gradient image frames are calculated based on the difference between pairs of quantized image frames. The pairs of quantized image frames may be consecutive image frames which often exhibit small offsets relative to each other. Thus, in this case, no rigid translation need be performed on a single image frame to generate an offset image frame.

Example System

Figure 10:
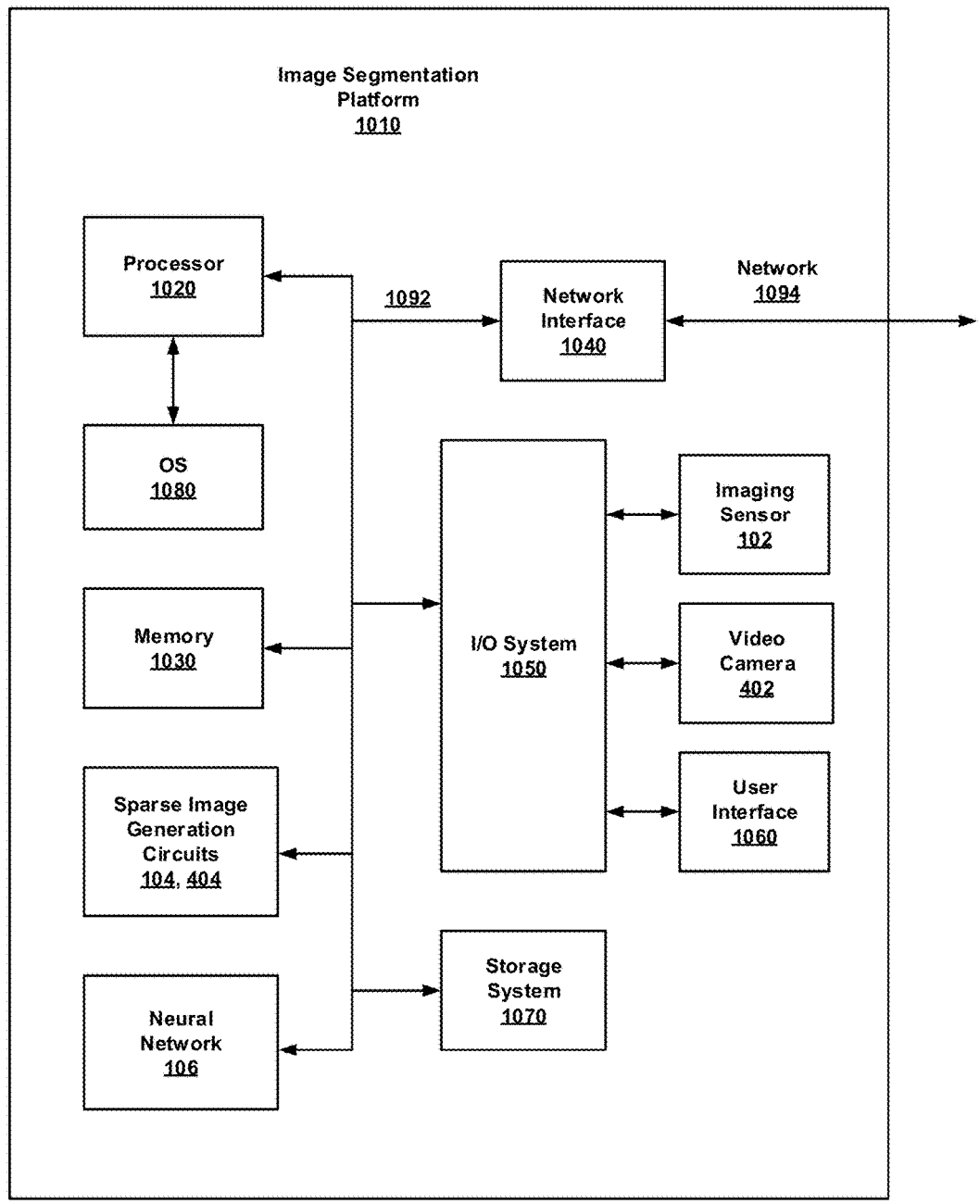
FIG. 10 is a block diagram schematically illustrating a platform to perform image difference based segmentation, configured in accordance with certain embodiments of the present disclosure.

FIG. 10 illustrates an example system 1000 to perform image difference based segmentation, configured in accordance with certain embodiments of the present disclosure. In some embodiments, system 1000 comprises an image segmentation platform 1010 which may host, or otherwise be incorporated into a personal computer, workstation, server system, laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet), mobile internet device (MID), messaging device, data communication device, and so forth. Any combination of different devices may be used in certain embodiments.

In some embodiments, platform 1010 may comprise any combination of a processor 1020, a memory 1030, sparse image generation circuits 104, 404, neural network 106, a network interface 1040, an input/output (I/O) system 1050, imaging sensor 102 and/or video camera 402, a user interface 1060, and a storage system 1070. As can be further seen, a bus and/or interconnect 1092 is also provided to allow for communication between the various components listed above and/or other components not shown. Platform 1010 can be coupled to a network 1094 through network interface 1040 to allow for communications other computing devices, platforms, or resources. In some embodiments, the image segmentation platform 1010 may be integrated in the imaging sensor 102 and/or the video camera 402. Other componentry and functionality not reflected in the block diagram of FIG. 10 will be apparent in light of this disclosure, and it will be appreciated that other embodiments are not limited to any particular hardware configuration.

Processor 1020 can be any suitable processor, and may include one or more coprocessors or controllers, such as an audio processor, a graphics processing unit, or a sensor hub processor, to assist in control and processing operations associated with system 1000. In some embodiments, the processor 1020 may be implemented as any number of processor cores. The processor (or processor cores) may be any type of processor, such as, for example, a microprocessor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 1020 may be implemented as a complex instruction set computer (CISC) or a reduced instruction set computer (RISC) processor. In some embodiments, processor 1020 may be configured as an x86 instruction set compatible processor.

Memory 1030 can be implemented using any suitable type of digital storage including, for example, flash memory and/or random access memory (RAM). In some embodiments, the memory 1030 may include various layers of memory hierarchy and/or memory caches as are known to those of skill in the art. Memory 1030 may be implemented as a volatile memory device such as, but not limited to, a RAM, dynamic RAM (DRAM), or static RAM (SRAM) device. Storage system 1070 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 1070 may comprise technology to increase the storage performance enhanced protection for valuable digital media when multiple hard drives are included.

Processor 1020 may be configured to execute an Operating System (OS) 1080 which may comprise any suitable operating system, such as Google Android (Google Inc., Mountain View, Calif.), Microsoft Windows (Microsoft Corp., Redmond, Wash.), Apple OS X (Apple Inc., Cupertino, Calif.), Linux, or a real-time operating system (RTOS). As will be appreciated in light of this disclosure, the techniques provided herein can be implemented without regard to the particular operating system provided in conjunction with system 1000, and therefore may also be implemented using any suitable existing or subsequently-developed platform.

Network interface circuit 1040 can be any appropriate network chip or chipset which allows for wired and/or wireless connection between other components of computer system 1000 and/or network 1094, thereby enabling system 1000 to communicate with other local and/or remote computing systems, servers, cloud-based servers, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 1050 may be configured to interface between various I/O devices and other components of computer system 1000. I/O devices may include, but not be limited to, user interface 1060, imaging sensor 102, and/or video camera 402. User interface 1060 may include devices (not shown) such as a display element, touchpad, keyboard, mouse, microphone, and speaker, etc. I/O system 1050 may include a graphics subsystem configured to perform processing of images for rendering on a display element. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 1020 or any chipset of platform 1010.

It will be appreciated that in some embodiments, the various components of the system 1000 may be combined or integrated in a system-on-a-chip (SoC) architecture. In some embodiments, the components may be hardware components, firmware components, software components or any suitable combination of hardware, firmware or software.

Sparse image generation circuits 104, 404 are configured to generate sparse image frames from which the neural network 106 may perform image segmentation, as described previously. Sparse image generation circuits 104, 404 may include any or all of the components illustrated in FIGS. 2 and 5, as described above. Sparse image generation circuits 104, 404 and neural network 106 can be implemented or otherwise used in conjunction with a variety of suitable software and/or hardware that is coupled to or that otherwise forms a part of platform 1010. These circuits can additionally or alternatively be implemented or otherwise used in conjunction with user I/O devices that are capable of providing information to, and receiving information and commands from, a user.

In some embodiments, these circuits may be installed local to system 1000, as shown in the example embodiment of FIG. 10. Alternatively, system 1000 can be implemented in a client-server arrangement wherein at least some functionality associated with these circuits is provided to system 1000 using an applet, such as a JavaScript applet, or other downloadable module. Such a remotely accessible module or sub-module can be provisioned in real-time, in response to a request from a client computing system for access to a given server having resources that are of interest to the user of the client computing system. In such embodiments, the server can be local to network 1094 or remotely coupled to network 1094 by one or more other networks and/or communication channels. In some cases, access to resources on a given network or computing system may require credentials such as usernames, passwords, and/or compliance with any other suitable security mechanism.

In various embodiments, system 1000 may be implemented as a wireless system, a wired system, or a combination of both. When implemented as a wireless system, system 1000 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, system 1000 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the image segmentation methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 1094. In other embodiments, the functionalities disclosed herein can be incorporated into other software applications, such as system monitoring applications. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments system 1000 may comprise additional, fewer, or alternative sub-components as compared to those included in the example embodiment of FIG. 10.

The aforementioned non-transitory computer readable medium may be any suitable medium for storing digital information, such as a hard drive, a server, a flash memory, and/or random access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is at least one non-transitory computer readable storage medium having instructions encoded thereon that, when executed by one or more processors, result in the following operations for image segmentation. The operations comprise: quantizing pixels of a first image frame; performing a differencing operation between the quantized first image frame and a quantized second image frame to generate a sparse image frame; and applying a neural network to the sparse image frame to generate a segmented image.

Example 2 includes the subject matter of Example 1, wherein at least one of the first image frame and the second image frame is generated by an imaging sensor and the processor is integrated into the imaging sensor.

Example 3 includes the subject matter of Examples 1 or 2, wherein at least one of the first image frame and the second image frame is generated by one or more imaging sensors, the one or more imaging sensors including at least one of a video camera and a still camera.

Example 4 includes the subject matter of any of Examples 1-3, wherein the second image frame is generated by performing a rigid translation of the quantized first image frame to generate the quantized second image frame.

Example 5 includes the subject matter of any of Examples 1-4, further comprising: quantizing pixels of a first training image frame; performing a differencing operation between the quantized first training image frame and a quantized second training image frame to generate a sparse training image frame; and training the neural network on the sparse training image frame.

Example 6 includes the subject matter of any of Examples 1-5, wherein the second training image frame is generated by performing a rigid translation of the quantized first training image frame to generate the quantized second training image frame.

Example 7 includes the subject matter of any of Examples 1-6, wherein the pixels are quantized to a selected number of bits, the number of bits selected from the range of four bits to seven bits; and further comprising normalizing the pixels of the first image frame relative to other image frames to be segmented.

Example 8 includes the subject matter of any of Examples 1-7, wherein the neural network is a recursive convolutional neural network.

Example 9 is at least one non-transitory computer readable storage medium having instructions encoded thereon that, when executed by one or more processors, result in the following operations for image segmentation, the operations comprising: receiving a sequence of image frames; quantizing pixels of a first image frame of the sequence of image frames; quantizing pixels of a second image frame of the sequence of image frames; performing a differencing operation between the quantized first image frame and the quantized second image frame to generate a sparse image frame; and applying a neural network to the sparse image frame to generate a segmented image.

Example 10 includes the subject matter of Example 9, wherein the sequence of image frames is generated by a video camera and the processor is integrated into the video camera.

Example 11 includes the subject matter of Examples 9 or 10, further comprising: quantizing pixels of a first training image frame; performing a rigid translation of the quantized first training image frame to generate a second training image frame; performing a differencing operation between the quantized first training image frame and the second training image frame to generate a sparse training image frame; and training the neural network on the sparse training image frame.

Example 12 includes the subject matter of Examples 9-11, wherein the pixels are quantized to a selected number of bits, the number of bits selected from the range of four bits to seven bits.

Example 13 includes the subject matter of Examples 9-12, further comprising normalizing the pixels of the first image frame and the second image frame relative to other image frames of the sequence of image frames.

Example 14 includes the subject matter of Examples 9-13, wherein the neural network is a recursive convolutional neural network.

Example 15 is a system for image segmentation, the system comprising: a sparse image generation circuit including: a quantization circuit to quantize pixels of a first image frame; a translation circuit to perform a rigid translation of the quantized first image frame to generate a second image frame; and a differencing circuit to perform a differencing operation between the quantized first image frame and the second image frame to generate a sparse image frame; and a neural network to generate a segmented image based on the sparse image frame.

Example 16 includes the subject matter of Example 15, further comprising an imaging sensor to generate the first image frame, and wherein the system for image segmentation is integrated into the imaging sensor.

Example 17 includes the subject matter of Examples 15 or 16, further comprising a neural network training circuit to train the neural network on sparse training image frames, the sparse training image frames generated by the sparse image generation circuit based on a plurality of training image frames.

Example 18 includes the subject matter of Examples 15-17, wherein the pixels are quantized to a selected number of bits, the number of bits selected from the range of four bits to seven bits.

Example 19 includes the subject matter of Examples 15-18, further comprising a normalization circuit to normalize the pixels of the first image frame relative to other image frames to be segmented.

Example 20 includes the subject matter of Examples 15-19, wherein the neural network is a recursive convolutional neural network.

Example 21 is a system for image segmentation, the system comprising: a sparse image sequence generation circuit including: a quantization circuit to quantize pixels of a first image frame and a second image frame of a sequence of image frames; and a differencing circuit to perform a differencing operation between the quantized first image frame and the quantized second image frame to generate a sparse image frame; and a neural network to generate a segmented image based on the sparse image frame.

Example 22 includes the subject matter of Example 21, further comprising a video camera to generate the sequence of image frames, and wherein the system for image segmentation is integrated into the video camera.

Example 23 includes the subject matter of Examples 21 or 22, further comprising a neural network training circuit to train the neural network on sparse training image frames, the sparse training image frames generated by the sparse image sequence generation circuit based on a plurality of training image frames.

Example 24 includes the subject matter of Examples 21-23, further comprising a normalization circuit to normalize the pixels of the first image frame and the second image frame relative to other image frames of the sequence of image frames; and wherein the pixels are quantized to a selected number of bits, the number of bits selected from the range of four bits to seven bits.

Example 25 includes the subject matter of Examples 21-24, wherein the neural network is a recursive convolutional neural network.

Example 26 is a method for image segmentation, the method comprising: quantizing, by a processor-based system, pixels of a first image frame; performing, by the processor-based system, a differencing operation between the quantized first image frame and a quantized second image frame to generate a sparse image frame; and applying, by the processor-based system, a neural network to the sparse image frame to generate a segmented image.

Example 27 includes the subject matter of Example 26, wherein at least one of the first image frame and the second image frame is generated by an imaging sensor and the processor is integrated into the imaging sensor.

Example 28 includes the subject matter of Examples 26 or 27, wherein at least one of the first image frame and the second image frame is generated by one or more imaging sensors, the one or more imaging sensors including at least one of a video camera and a still camera.

Example 29 includes the subject matter of Examples 26-28, wherein the second image frame is generated by performing a rigid translation of the quantized first image frame to generate the quantized second image frame.

Example 30 includes the subject matter of Examples 26-29, further comprising: quantizing pixels of a first training image frame; performing a differencing operation between the quantized first training image frame and a quantized second training image frame to generate a sparse training image frame; and training the neural network on the sparse training image frame.

Example 31 includes the subject matter of Examples 26-30, wherein the second training image frame is generated by performing a rigid translation of the quantized first training image frame to generate the quantized second training image frame.

Example 32 includes the subject matter of Examples 26-31, wherein the pixels are quantized to a selected number of bits, the number of bits selected from the range of four bits to seven bits; and further comprising normalizing the pixels of the first image frame relative to other image frames to be segmented.

Example 33 includes the subject matter of Examples 26-32, wherein the neural network is a recursive convolutional neural network.

Example 34 is a method for image segmentation, the method comprising: receiving, by a processor-based system, a sequence of image frames; quantizing, by the processor-based system, pixels of a first image frame of the sequence of image frames; quantizing, by the processor-based system, pixels of a second image frame of the sequence of image frames; performing, by the processor-based system, a differencing operation between the quantized first image frame and the quantized second image frame to generate a sparse image frame; and applying, by the processor-based system, a neural network to the sparse image frame to generate a segmented image.

Example 35 includes the subject matter of Example 34, wherein the sequence of image frames is generated by a video camera and the processor is integrated into the video camera.

Example 36 includes the subject matter of Examples 34 or 35, further comprising: quantizing pixels of a first training image frame; performing a rigid translation of the quantized first training image frame to generate a second training image frame; performing a differencing operation between the quantized first training image frame and the second training image frame to generate a sparse training image frame; and training the neural network on the sparse training image frame.

Example 37 includes the subject matter of Examples 34-36, wherein the pixels are quantized to a selected number of bits, the number of bits selected from the range of four bits to seven bits.

Example 38 includes the subject matter of Examples 34-37, further comprising normalizing the pixels of the first image frame and the second image frame relative to other image frames of the sequence of image frames.

Example 39 includes the subject matter of Examples 34-38, wherein the neural network is a recursive convolutional neural network.

Example 40 is a system for image segmentation, the system comprising: means for quantizing pixels of a first image frame; means for performing a differencing operation between the quantized first image frame and a quantized second image frame to generate a sparse image frame; and means for applying a neural network to the sparse image frame to generate a segmented image.

Example 41 includes the subject matter of Example 40, wherein at least one of the first image frame and the second image frame is generated by an imaging sensor and the processor is integrated into the imaging sensor.

Example 42 includes the subject matter of Examples 40 or 41, wherein at least one of the first image frame and the second image frame is generated by one or more imaging sensors, the one or more imaging sensors including at least one of a video camera and a still camera.

Example 43 includes the subject matter of Examples 40-42, wherein the second image frame is generated by performing a rigid translation of the quantized first image frame to generate the quantized second image frame.

Example 44 includes the subject matter of Examples 40-43, further comprising: means for quantizing pixels of a first training image frame; means for performing a differencing operation between the quantized first training image frame and a quantized second training image frame to generate a sparse training image frame; and means for training the neural network on the sparse training image frame.

Example 45 includes the subject matter of Examples 40-44, wherein the second training image frame is generated by performing a rigid translation of the quantized first training image frame to generate the quantized second training image frame.

Example 46 includes the subject matter of Examples 40-45, wherein the pixels are quantized to a selected number of bits, the number of bits selected from the range of four bits to seven bits; and further comprising normalizing the pixels of the first image frame relative to other image frames to be segmented.

Example 47 includes the subject matter of Examples 40-46, wherein the neural network is a recursive convolutional neural network.

Example 48 is a system for image segmentation, the system comprising: means for receiving a sequence of image frames; means for quantizing pixels of a first image frame of the sequence of image frames; means for quantizing pixels of a second image frame of the sequence of image frames; means for performing a differencing operation between the quantized first image frame and the quantized second image frame to generate a sparse image frame; and means for applying a neural network to the sparse image frame to generate a segmented image.

Example 49 includes the subject matter of Example 48, wherein the sequence of image frames is generated by a video camera and the processor is integrated into the video camera.

Example 50 includes the subject matter of Examples 48 or 49, further comprising: means for quantizing pixels of a first training image frame; means for performing a rigid translation of the quantized first training image frame to generate a second training image frame; means for performing a differencing operation between the quantized first training image frame and the second training image frame to generate a sparse training image frame; and means for training the neural network on the sparse training image frame.

Example 51 includes the subject matter of Examples 48-50, wherein the pixels are quantized to a selected number of bits, the number of bits selected from the range of four bits to seven bits.

Example 52 includes the subject matter of Examples 48-51, further comprising means for normalizing the pixels of the first image frame and the second image frame relative to other image frames of the sequence of image frames.

Example 53 includes the subject matter of Examples 48-52, wherein the neural network is a recursive convolutional neural network.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. At least one non-transitory computer readable storage medium having instructions encoded thereon that, when executed by one or more processors, result in the following operations for image segmentation, the operations comprising:
quantizing pixels of a first image frame;
performing a differencing operation between the quantized first image frame and a quantized second image frame to generate a sparse image frame; and
applying a neural network to the sparse image frame to generate a segmented image,
wherein the neural network is trained on a sparse training image frame generated by performing a differencing operation between a quantized first training image frame and a quantized second training image frame.

2. The computer readable storage medium of claim 1, wherein at least one of the first image frame and the second image frame is generated by an imaging sensor and the processor is integrated into the imaging sensor.

3. The computer readable storage medium of claim 1, wherein at least one of the first image frame and the second image frame is generated by one or more imaging sensors, the one or more imaging sensors including at least one of a video camera and a still camera.

4. The computer readable storage medium of claim 1, wherein the second image frame is generated by performing a rigid translation of the quantized first image frame to generate the quantized second image frame.

5. The computer readable storage medium of claim 1, wherein the quantized second training image frame is generated by performing a rigid translation of the quantized first training image frame.

6. The computer readable storage medium of claim 1, wherein the pixels are quantized to a selected number of bits, the number of bits selected from the range of four bits to seven bits; and further comprising normalizing the pixels of the first image frame relative to other image frames to be segmented.

7. The computer readable storage medium of claim 1, wherein the neural network is a recursive convolutional neural network.

8. At least one non-transitory computer readable storage medium having instructions encoded thereon that, when executed by one or more processors, result in the following operations for image segmentation, the operations comprising:
receiving a sequence of image frames;
quantizing pixels of a first image frame of the sequence of image frames;
quantizing pixels of a second image frame of the sequence of image frames;
performing a differencing operation between the quantized first image frame and the quantized second image frame to generate a sparse image frame; and
applying a neural network to the sparse image frame to generate a segmented image,
wherein the neural network is trained on a sparse training image frame generated by performing a differencing operation between a quantized first training image frame and a quantized second training image frame.

9. The computer readable storage medium of claim 8, wherein the sequence of image frames is generated by a video camera and the processor is integrated into the video camera.

10. The computer readable storage medium of claim 8, wherein the quantized second training image frame is generated by performing a rigid translation of the quantized first training image frame.

11. The computer readable storage medium of claim 8, wherein the pixels are quantized to a selected number of bits, the number of bits selected from the range of four bits to seven bits.

12. The computer readable storage medium of claim 8, further comprising normalizing the pixels of the first image frame and the second image frame relative to other image frames of the sequence of image frames.

13. The computer readable storage medium of claim 8, wherein the neural network is a recursive convolutional neural network.

14. A system for image segmentation, the system comprising:
a sparse image generation circuit including:
a quantization circuit to quantize pixels of a first image frame;
a translation circuit to perform a rigid translation of the quantized first image frame to generate a second image frame; and
a differencing circuit to perform a differencing operation between the quantized first image frame and the second image frame to generate a sparse image frame; and
a neural network to generate a segmented image based on the sparse image frame,
wherein the neural network is trained on sparse training image frames generated by the sparse image generation circuit based on a plurality of training image frames.

15. The system of claim 14, further comprising an imaging sensor to generate the first image frame, and wherein the system for image segmentation is integrated into the imaging sensor.

16. The system of claim 14, further comprising a neural network training circuit to train the neural network on sparse training image frames.

17. The system of claim 14, wherein the pixels are quantized to a selected number of bits, the number of bits selected from the range of four bits to seven bits.

18. The system of claim 14, further comprising a normalization circuit to normalize the pixels of the first image frame relative to other image frames to be segmented.

19. The system of claim 14, wherein the neural network is a recursive convolutional neural network.

20. A system for image segmentation, the system comprising:
   a sparse image sequence generation circuit including:
      a quantization circuit to quantize pixels of a first image frame and a second image frame of a sequence of image frames; and
      a differencing circuit to perform a differencing operation between the quantized first image frame and the quantized second image frame to generate a sparse image frame; and
   a neural network to generate a segmented image based on the sparse image frame,
   wherein the neural network is trained on sparse training image frames generated by the sparse image generation circuit based on a plurality of training image frames.

21. The system of claim 20, further comprising a video camera to generate the sequence of image frames, and wherein the system for image segmentation is integrated into the video camera.

22. The system of claim 20, further comprising a neural network training circuit to train the neural network on sparse training image frames.

23. The system of claim 20, further comprising a normalization circuit to normalize the pixels of the first image frame and the second image frame relative to other image frames of the sequence of image frames; and wherein the pixels are quantized to a selected number of bits, the number of bits selected from the range of four bits to seven bits.

24. The system of claim 20, wherein the neural network is a recursive convolutional neural network.

* * * * *